(12) United States Patent
Moller et al.

(10) Patent No.: US 7,399,416 B2
(45) Date of Patent: *Jul. 15, 2008

(54) REACTIVE FILTRATION

(75) Inventors: Greg Moller, Moscow, ID (US); Kevin Marshall Brackney, Moscow, ID (US); Roger Alan Korus, Moscow, ID (US); Gerald Michael Keller, Jr., Omaha, NE (US); Brian Keith Hart, Moscow, ID (US); Remembrance Louisa Newcombe, Hayden, ID (US)

(73) Assignee: Idaho Research Foundation, Inc., Moscow, ID (US)

( * ) Notice: Subject to any disclaimer, the term of this patent is extended or adjusted under 35 U.S.C. 154(b) by 147 days.

This patent is subject to a terminal disclaimer.

(21) Appl. No.: 10/727,963

(22) Filed: Dec. 3, 2003

(65) Prior Publication Data

US 2004/0144728 A1 Jul. 29, 2004

Related U.S. Application Data

(60) Provisional application No. 60/430,756, filed on Dec. 4, 2002.

(51) Int. Cl.
*C02F 1/28* (2006.01)
(52) U.S. Cl. .............. 210/673; 210/676; 210/679; 210/683; 210/688; 210/906; 210/912
(58) Field of Classification Search .............. 210/673, 210/679, 906, 676, 688, 683, 912
See application file for complete search history.

(56) References Cited

U.S. PATENT DOCUMENTS

| | | | |
|---|---|---|---|
| 2,528,099 A | 10/1950 | Wilcox et al. | |
| 2,696,462 A | 12/1954 | Bodkin | |
| 2,730,239 A | 1/1956 | Peery | |
| 2,863,829 A | 12/1958 | Henke et al. | |
| 3,056,743 A | 10/1962 | Eichhorn et al. | |

(Continued)

FOREIGN PATENT DOCUMENTS

DE  27 24 254 A  11/1978

(Continued)

OTHER PUBLICATIONS

Beltran, "Heterogeneous Catalytic Ozonation," Ozone Reaction Kinetics for Water and Wastewater Systems, Chapter 10, Lewis Publishers, 2004, pp. 227-276.

(Continued)

*Primary Examiner*—Matthew O. Savage

(57) ABSTRACT

In one embodiment, a reactive filtration method includes continuously regenerating a reactive filter media while simultaneously filtering contaminants from fluid flowing through the filter media. In one embodiment, regenerating the reactive filter media comprises mixing metal granules with the filter media and agitating the mixture. In another embodiment, regenerating the reactive filter media comprises introducing a metal in the fluid flowing through the filter media and agitating the filter media. In one embodiment, a method for removing phosphorus, arsenic or a heavy metal from water includes introducing a metal salt reagent into the water at a molar ratio of 5:1 to 200:1 to the phosphorous or the arsenic in the water and passing the water through a bed of moving sand.

1 Claim, 2 Drawing Sheets

U.S. PATENT DOCUMENTS

| | | | |
|---|---|---|---|
| 3,499,837 A | 3/1970 | Jaunarajs | |
| 3,537,582 A | 11/1970 | Demeter | |
| 3,619,425 A | 11/1971 | Palaiseau et al. | |
| 3,674,684 A | 7/1972 | Gollan | |
| 3,679,581 A | 7/1972 | Kunz | |
| 4,003,832 A | 1/1977 | Henderson et al. | |
| 4,049,545 A | 9/1977 | Horvath | |
| 4,126,546 A | 11/1978 | Hjelmner et al. | |
| 4,145,280 A | 3/1979 | Middelbeek et al. | |
| 4,269,716 A | 5/1981 | Gurian | |
| 4,366,128 A | 12/1982 | Weir et al. | |
| 4,842,744 A | 6/1989 | Schade | |
| 5,087,374 A | 2/1992 | Ding | |
| 5,173,194 A | 12/1992 | Hering, Jr. | |
| 5,190,659 A | 3/1993 | Wang et al. | |
| 5,236,595 A | 8/1993 | Wang et al. | |
| 5,369,072 A | 11/1994 | Benjamin et al. | |
| 5,372,720 A | 12/1994 | Jonsson | |
| 5,443,729 A | 8/1995 | Sly et al. | |
| 5,454,959 A | 10/1995 | Stevens | |
| 5,534,153 A | 7/1996 | Scott et al. | |
| 5,670,046 A | 9/1997 | Kimmel | |
| 5,679,257 A | 10/1997 | Coate et al. | |
| 5,707,528 A | 1/1998 | Berry | |
| 5,746,913 A | 5/1998 | Chang et al. | |
| 5,755,977 A | 5/1998 | Gurol et al. | |
| 5,843,308 A | 12/1998 | Suozzo et al. | |
| 5,876,606 A * | 3/1999 | Blowes et al. | 210/679 |
| 5,911,882 A | 6/1999 | Benjamin et al. | |
| 6,077,446 A | 6/2000 | Steiner et al. | |
| 6,132,623 A * | 10/2000 | Nikolaidis et al. | 210/719 |
| 6,143,186 A | 11/2000 | Van Unen | |
| 6,200,482 B1 * | 3/2001 | Winchester et al. | 210/681 |
| 6,217,765 B1 | 4/2001 | Yamasaki et al. | |
| 6,334,956 B1 | 1/2002 | Hanemaaijer | |
| 6,426,005 B1 | 7/2002 | Larsson | |
| 6,432,312 B1 | 8/2002 | Fuss | |
| 6,464,877 B1 | 10/2002 | Mori et al. | |
| 6,468,942 B1 | 10/2002 | Sansalone | |
| 6,471,857 B1 | 10/2002 | Kaibara | |
| 6,630,071 B1 | 10/2003 | Buisman et al. | |
| 6,663,781 B1 * | 12/2003 | Huling et al. | 210/668 |
| 6,716,344 B1 | 4/2004 | Bassi et al. | |
| 6,942,786 B1 | 9/2005 | Fosseng | |
| 6,942,807 B1 | 9/2005 | Meng et al. | |
| 7,029,589 B2 | 4/2006 | McGinness | |
| 2004/0144728 A1 | 7/2004 | Moller et al. | |
| 2005/0127003 A1 | 6/2005 | Dennis | |
| 2005/0173348 A1 | 8/2005 | Drake | |
| 2006/0000784 A1 | 1/2006 | Khudenko | |
| 2006/0000785 A1 | 1/2006 | Moller | |
| 2007/0136919 P1 | 6/2007 | Bak et al. | |

FOREIGN PATENT DOCUMENTS

| | | |
|---|---|---|
| GB | 471 277 A | 9/1937 |
| GB | 1596205 | 8/1981 |
| JP | 2001-070954 | 3/2001 |
| WO | WO2004050561 | 6/2004 |

OTHER PUBLICATIONS

Ravikumar, et al., "Chemical Oxidation of Chlorinated Organics by Hydrogen Peroxide in the Presence of Sand," Environ. Sci. Technol., 1994, 28, pp. 394-400.

* cited by examiner

REACTIVE FILTRATION

CROSS REFERENCE TO RELATED APPLICATION

This application claims subject matter disclosed in co-pending provisional patent application Ser. No. 60/430,756 filed Dec. 4, 2002, entitled Reactive Filtration.

STATEMENT OF RIGHTS TO INVENTIONS MADE UNDER FEDERALLY FUNDED RESEARCH AND DEVELOPMENT

Part of the work performed during the development of embodiments of the invention was funded by the United States Environmental Protection Agency under contract no. EPA-EPSCoR GR827683-01-0. The United States government may have certain rights in the invention.

BACKGROUND

Phosphorus exists in waters as dissolved ortho-phosphate, polyphosphate, and complex organo-phosphorus compounds. In typical phosphorus-containing waste waters, such as the secondary or tertiary effluents of municipal waste water treatment plants, there is a dissolved fraction of phosphorus compounds, primarily in the form of ortho-phosphate and poly-phosphates, and a suspended fraction of micro-particulate phosphorus-containing solids. Trace levels of arsenic are sometimes found in some sources of drinking water and in higher concentrations in some waste waters. Arsenic can occur in natural waters as reduced arsenite, As(III), or oxidized arsenate, As(V).

Several methods are currently utilized for the removal of phosphorus compounds, arsenic, and other contaminants from waste water. Micro-particulate and other solid contaminants are typically removed by filtration using a solid media such as sand, and sedimentation, where solid contaminants with higher densities than water are allowed to settle. Dissolved contaminants are typically removed by flocculation and sorption. In flocculation, metal salt solutions are mixed with waste water to precipitate the contaminant out of solution, where it can then be removed through filtration or sedimentation. In sorption, contaminated waste water is passed through a stationary filtration media, typically iron oxide coated sand, having a partially charged cationic boundary layer that is reactive with a target contaminant dissolved in the waste water.

In conventional fixed-bed filtration systems, filtration media can quickly lose its filtration efficiency as the interstitial spaces between the particles of the filtration media become saturated with micro-particulate and solid contaminants. Thus, the filtration media must be flushed or replaced, which tends to be costly and time intensive. Additionally, the filtration process must be stopped while the filtration media is being flushed or replaced.

Moving-bed filtration devices seek to mitigate these limitations by utilizing processes that remove micro-particulate and solid contaminants from the filtration media while simultaneously filtering water. These moving-bed filtration devices still have a disadvantage in that they do not remove dissolved contaminants from waste water.

U.S. Pat. No. 5,369,072 to Benjamin et al. describes methods of preparing iron-oxide coated sand to be used as a filtration media in either fixed-bed or moving-bed systems to remove both solid and dissolved contaminants from waste water. When such a filtration media is used in a fixed-bed system, there remains the disadvantage of having to flush or replace the filter media on a regular basis to remove the solid contaminant waste. Although the use of this media in a moving-bed system may overcome these disadvantages, it does not overcome a disadvantage common to the use of the described iron oxide coated sand in either system. That is, the reactive surface of the iron oxide coated sand becomes saturated with adsorbed contaminants, and therefore needs to be either replaced or regenerated. Benjamin states that the adsorbed contaminant can be desorbed by treating the saturated filtration media with a solution with a pH range that is known to desorb the specific contaminant ion from the specific adsorbing surface. Therefore, in either a fixed-bed or moving-bed system, filtration of water must stop to allow the filtration media to be rinsed with pH solution.

Environmental concerns and increasingly stricter government regulations have many industries searching for cost-effective and efficient water-treatment solutions. Additionally, there is a recognized need to be able to filter out water contaminants that exist in what may be considered trace amounts. For example, the removal capability of conventional coagulation-precipitation methods drop off significantly at contaminant levels lower than 500 parts per billion (ppb). However, science has recognized that ambient phosphorus levels in water greater than 10-20 ppb can lead to eutrophication. The U.S. Environmental Protection Agency is pushing for lower limits of phosphorus in effluents. Currently, the EPA estuarine water criteria for total phosphorus is 0.10 mg/L. High volume dischargers are experiencing a reduction in the levels allowed in their regulatory permits.

DETAILED DESCRIPTION

Embodiments of the invention were developed in an effort to more efficiently remove contaminants from waste water by increasing flows through a filtration system, even when contaminants are present in relatively small amounts. "Waste water" as used in this Description and in the Claims means any water to be treated—it is not necessarily highly contaminated water and may contain only trace amounts of phosphorus, arsenic, or other contaminants (organic or inorganic and in single or mixed solution).

Figure 1:
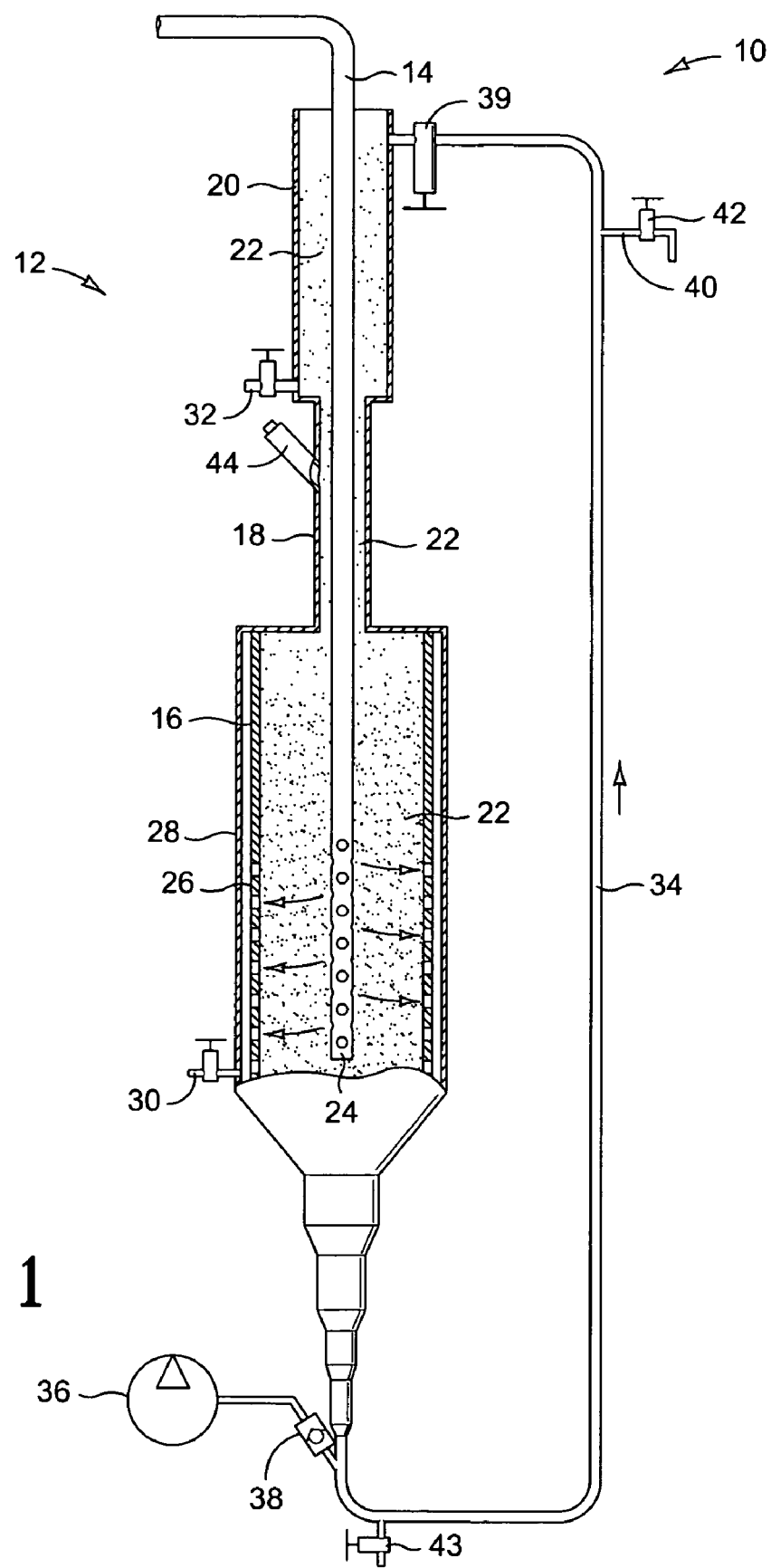
FIG. 1 illustrates a moving bed particle filtration system that may be used to implement various embodiments of the invention.

FIG. 1 illustrates a moving-bed particle radial filtration system 10 that may be used to implement various embodiments of the invention. Referring to FIG. 1, waste water flows into a vertically oriented cylindrical treatment vessel 12 through an inlet pipe 14. Vessel 12 includes a filter chamber 16, a stem 18 and an expansion gravity settling chamber 20. Filter chamber 16 contains a bed of sand 22, iron oxide coated sand, sand and iron granules or another suitable filter media. Inlet pipe 14 extends down into filter chamber 16. Waste water is discharged into sand 22 along the perforated lower part 24 of inlet pipe 14. Treated water flows out of filter chamber 16 through a perforated outer perimeter 26 into a sleeve 28 and is removed from vessel 12 through an outlet pipe 30. The perforations in the lower part 24 of inlet pipe 14 and the outer perimeter 26 of filter chamber 16 are screened as necessary to prevent sand from passing through the perforations.

The comparatively narrow stem 18 of vessel 12 connects filter chamber 16 with expansion chamber 20. A sludge removal port 32 is positioned near the bottom of expansion chamber 20. A recirculation pipe 34 extends from the bottom of filter chamber 16 to the top of expansion chamber 20. An air compressor 36 pumps air into recirculation pipe 34 at the bottom of filter chamber 16 causing a counterclockwise motion of air, water, sand and filtered particulates through vessel 12. A back flow preventer 38, such as a flapper valve, prevents materials in recirculation pipe 34 from flowing back into compressor 36. A flow control valve 39, sampling tube 40, sampling valve 42 and clean-out 43 on recirculation pipe 34, and a sight glass 44 in stem 18, may be provided if necessary or desirable.

In operation, waste water pumped into filter chamber 16 through inlet pipe 14 passes radially through sand 22 into sleeve 28 and flows out outlet pipe 30 as treated water. Sand 22 moves continuously down through vessel 12 under the influence of gravity. An aerated mixture of used sand and water flows from the bottom of filter chamber 16 back up to expansion chamber 20 through recirculation pipe 34 along with contaminants removed from the waste water. Air is vented to the atmosphere at the top of expansion chamber 20 to prevent pressurization of the system. The pressure head of water in sand 22 is kept such that some of the treated water flows from filter chamber 16 up through stem 18 into expansion chamber 20 to rinse contaminants from the used sand particles returning to expansion chamber 20. This rinse water, now carrying a high concentration of contaminants less dense than sand, is removed from chamber 22 and flows out through sludge removal port 32. In a preferred operation, the top of the sand bed for filtration is three fourths the height of filter chamber 16. Expansion chamber 20 and narrow stem 18 contain a dilute sand and water mixture that contains filtered particles that have been moved first to the bottom of sand 22 and circulated via pipe 34 into the water residing in expansion chamber 20. Water flow at inlet pipe 14, outlets 30 and 32 and recirculation pipe 34 can be balanced so that a preferred rate of 5-10% of the inlet water carrying contaminants is discharged through sludge removal port 32.

The system of FIG. 1 may be used to implement a process for continuously regenerating an iron oxide coated sand bed while simultaneously filtering contaminants from the incoming flow of waste water. The process creates and utilizes a reactive filter media that removes contaminants by filtering and by adsorption. A reactive filter media is any filter media with the additional capability of removing contaminants from waste water through chemical processes such as adsorption. The iron oxide coated sand bed, a reactive filter media, screens contaminants from the water and the reactive surfaces of the granules of sand adsorb contaminants from the water. In one embodiment, iron metal granules in proportions of 10-30% by volume in sand bed 22 provide a solid phase reactive surface of corroding iron metal as well as a source of dissolved iron such as salts of Fe(II) and Fe(III) that react with the sand in the filter bed to create reactive iron oxide coated sand. The strongly reducing nature of water solutions with iron metal and sand mixtures can be useful for chemical reactions, such as the reductive degradation of organic solvents dissolved in contaminated water. Reduction potentials lower than −200 mV versus the standard hydrogen electrode can be observed with 30% iron:sand mixtures.

In an alternative embodiment, a reagent capable of creating a reactive surface on the filter media is added to the incoming flow of waste water at molar ratios such as 5:1 to 200:1 with the target contaminant. While it is expected that soluble forms of manganese, aluminum or other metals such as zinc and copper will provide suitable reagents, iron will typically be used as the reagent due to its proven reactivity with a variety of contaminants and its current widespread use in water treatment. Ferric chloride, for example, is a preferred reagent when phosphorus or arsenic is the target contaminant. In any particular water targeted for treatment, their may be alternate and competitive reactive pathways for the added active reagents. These pathways will be the result of the specific water chemistry in the waste water. For example, waste water with high levels of dissolved carbonate or phosphate can react with added iron salts in competition to the target contaminant such as arsenic. Molar ratios of Fe(III) to water arsenic in field studies have been in excess of 100:1. In these studies, inlet concentrations of arsenic in source water for drinking were reduced from approximately 40 parts per billion to less than 5 parts per billion treating at a rate of 10 gallon per minute in a pilot scale operation. However, other water types may have less alternate, competitive reactive pathways. It is preferred to field test to determine the optimal molar ratio for any particular treatment environment to ensure sufficient excess reagent is delivered to the reactive sand surface to form iron oxide coated sand. Additional considerations in reagent balancing direct efforts to minimizing reagent addition to ensure that the process effluents are not overly high in dissolved iron or other reagent, thereby creating an additional treatment or discharge concern. Excess reagent consumption will also undesirably increase the cost of operation of the process.

In the removal of dissolved and suspended phosphorus, field studies have demonstrated that successful high flow, low concentration removal occurs in this process in iron to phosphorous molar rations of 5:1 to 40:1. It is preferred that the actual reagent dose is optimized to ensure near complete solution reaction and saturation of all of the competing reactive pathways and allowing for residual iron in the solution to react with the sand bed. In some phosphorus contaminated test waste waters, optimizing the correct balance of conditions yields a preferred ratio of iron to phosphorus at 8:1. The metal salt reagent, ferric chloride in this example, reacts with the surface of the sand to form iron oxide coated sand (IOCS). IOCS provides a stationary phase removal pathway for water borne contaminants such as phosphorus and arsenic. Contaminants in the waste water are exposed as a "mobile" phase over the "stationary" (slowly moving) IOCS bed for high efficiency sorptive and ion exchange removal. The physical action of the moving sand abrades the surface of the sand granules, regenerating active sites for additional iron salt and water contaminant reactions. Hence, regenerated reactive sites for contaminant binding are continually presented to the flowing water. Abraded sand-iron-contaminant solids are removed by the screen filtering action of the sand bed. The treated water exits the sand filter bed with contaminants substantially removed, ready for discharge or post-treatment processing.

Sorption is the removal of undersaturated solutes from solution onto minerals. Sorbate is the species removed from solution and the sorbent is the solid onto which solution species are sorbed. There are three types of sorption: adsorption wherein solutes are held at the mineral surface as a hydrated species; absorption wherein solute is incorporated into the mineral structure at the surface; and ion exchange wherein an ion becomes sorbed to a surface by changing places with a similarly charged ion previously residing on the sorbent. Mineral surfaces, such as the silicates in sand, have fixed or acquired surface charges that can be modified by water chemistry such as pH and dissolved solutes such as iron salts that can complex with the surface charges of sand. As a result of fixed surface charges, a property of the mineral, and pH, a property of the water, mineral surfaces develop a point of zero net proton charge (PZNPC). The PZNPC is the pH at which net surface charge is zero. At lower pH than PZNPC, the net surface charge is positive and at higher pH, the net surface charge is negative. These surface charges allow attraction of oppositely charged anions or cations, respectively, from solution. Larger amounts of dissolved constituents, such as positively charged Fe(III) can be attracted to a negatively charged surface such as the silicates in sand to such a degree that the surface becomes overall positively charged and therefore attractive to anions such as phosphate and arsenate. Silica, $SiO_2$ has a low PZNPC of 2, whereas iron oxyhydroxide, $\alpha$-FeOOH has a PZNPC of 7.8, and iron hydroxide, $Fe(OH)_3$ has a PZNPC of 8.5. Increasing quantities of iron oxide forming on a sand surface will increase the PZNCP of the sand grains such that net surface charge is positive and thereby attractive to anions such as phosphate and arsenate at higher pH levels of about 6-8. Most environmental waters, including drinking water and wastewaters exist at these circum-neutral pH levels. Hence, the selective addition of iron oxides to the sand creates a useful sorbent.

In a moving sand bed system such as the one shown in FIG. 1, concentrated contaminants, now in the form of filterable solid waste, are removed from the system through sludge removal port 32 via continuous rinsing in expansion chamber 18. This continuous rinsing and waste removal process is particularly important in the case of a hazardous material such as arsenic in drinking water. Rinse/waste water outflow, typically 5-10% of the incoming water, can be recycled and put back into the process following separation of the suspended solids by settling or clarification. In a fixed-bed system, in which the particulate filtrate remains on the sand and in the sand, the sand bed is periodically flushed or changed out to remove the concentrated contaminant waste.

Figure 2:
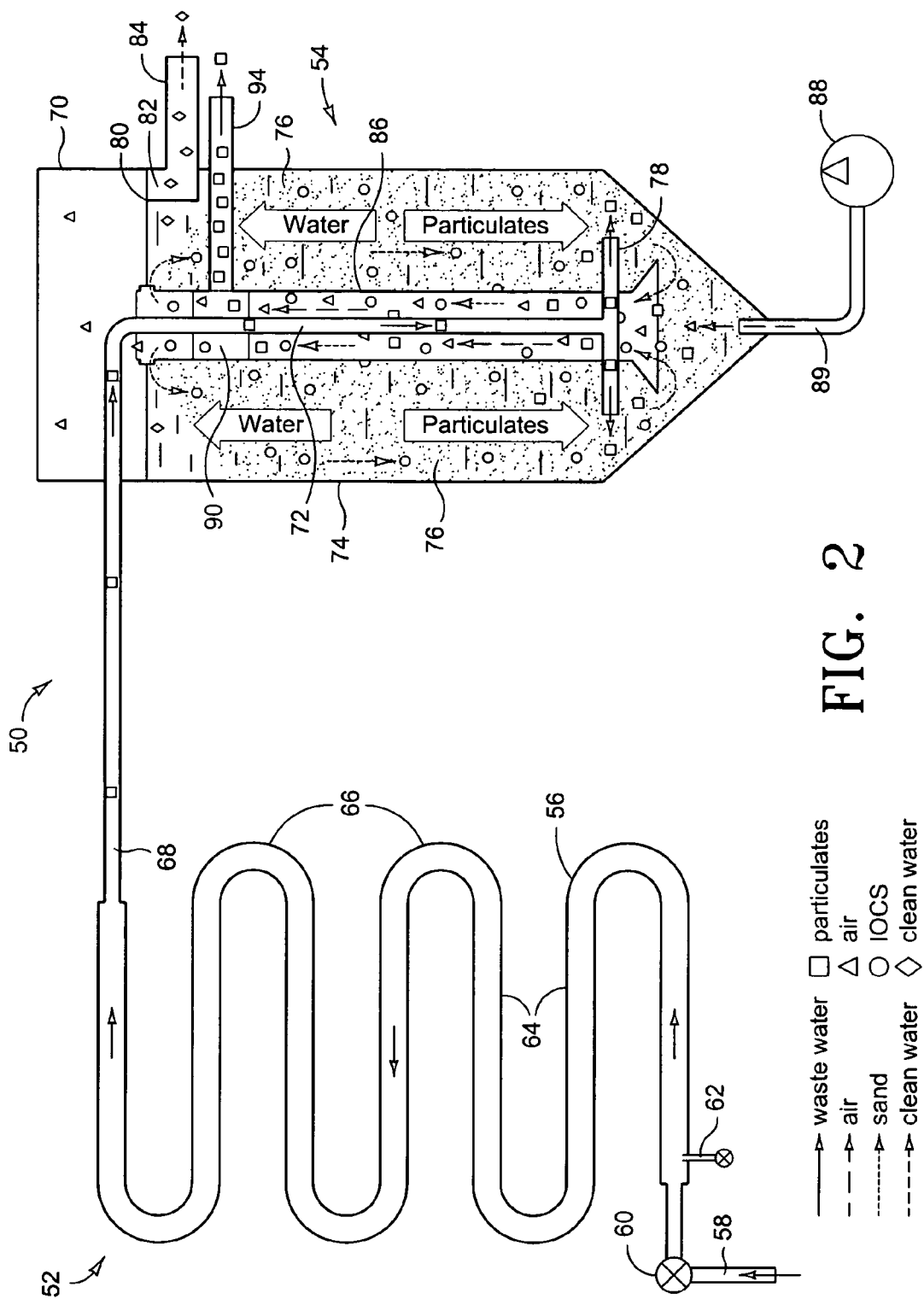
FIG. 2 illustrates a moving bed filtration system constructed according to one embodiment of the invention in which the waste water is pre-treated with a reagent.

FIG. 2 illustrates a novel moving bed filtration system 50 constructed according to one embodiment of the invention in which the waste water is pre-treated with a metal salt reagent. Referring to FIG. 2, filtration system 50 includes a pre-reactor system 52 and a reactive filter system 54. Waste water is pumped into the serpentine piping 56 of pre-reactor 52 through an inlet pipe 58 and flow control valve 60. A metal salt or other suitable reagent is introduced into serpentine piping 56 through a reagent inlet port 62 immediately downstream from inlet pipe 58. Preferably, serpentine piping 56 is substantially larger than inlet pipe 58 to slow the flow through piping 56 compared to inlet pipe 58. A slower flow increases the time available for the reagent to mix with the waste water and react with contaminants in the waste water. The waste water flow will be more turbulent near the transition from the smaller inlet pipe 58 to the larger serpentine piping 56. Introducing the reagent into this turbulent flow also helps mixing.

The waste water/reagent mix flows through straight-aways 64 and gentle bends 66 of serpentine piping 56. The waste water/reagent mix exits serpentine piping 56 into an outlet pipe 68 that takes the mix into reactive filter system 54. Prescribed overdosing introduces the reagent in sufficient quantities and concentrations to (1) allow for the co-precipitation and flocculation reactions between the reagent and the dissolved contaminants in pre-reactor system 52 to go to near completion to dilute levels where equilibrium and diffusion limited processes limit further reaction, (2) saturate competing reactive pathways with natural waters with reagent, and (3) leave enough excess reagent in the mix to activate the filter media in reactive filter system 54. The amount of excess reagent is determined by the reactive capacity of the influent solution and the desire to deliver excess reagent to the sand filtration bed for the continuous formation of iron oxide coated sand.

The comparatively slow flow through serpentine piping 56 allows for better coagulation of precipitates. The straight-aways 64 allow for less turbulent flow to enhance coagulation. Periodic gentle bends 66 introduce and maintain additional turbulent flow and introduce flow vortices to periodically mix the flowing solution. Preferably, the serpentine mixing array allows for a decrease in flow velocity for 2-8 minutes to allow for sufficient pre-reaction time. Design of the array needs to consider maintaining sufficient flow to prevent deposition of precipitation solids in the pre-reactor assembly. The actual length and diameter of serpentine piping 56 for most applications will result for an optimization of the required reaction time (usually 1-5 minutes), the desired flow rate, the space available at the site of deployment, and the presence of competing reactions in the treatment water.

The pre-treated waste water flows into the vertically oriented cylindrical treatment vessel 70 of reactive filtration system 54 through an inlet pipe 72. Inlet pipe 72 is positioned at the center of vessel 70. Vessel 70 includes a filter chamber 74 that contains a bed of sand 76 or another suitable filter media. Inlet pipe 72 extends down into filter chamber 74 to discharge the waste water into the lower portion of sand bed 76 through a perforated manifold 78. Waste water pumped into filter chamber 74 passes up through sand 76, over a baffle 80 near the top of filter chamber 74 as fully treated water, into a basin 82 and is removed from vessel 70 through an outlet pipe 84.

A recirculation tube 86 extends from the bottom to the top of filter chamber 74 at the center of vessel 70. Inlet pipe 72 extends down the center of recirculation tube 86. Inlet flow discharge manifold 78 extends out through openings in recirculation tube 86. An air compressor 88 pumps air into used sand and water at the bottom of vessel 70 through an air inlet pipe 89. The aerated mixture of used sand and water rises through recirculation tube 86 along with contaminants removed from the waste water up to a sand and particulate/water separator 90. Separator 90 represents generally any suitable separation device that may use, for example, physical separation, gravity separation, particle size separation, magnetic separation, membrane separation, or cyclonic separation. The sand removed from the mix by separator 90 is recycled back to filter chamber 74. The now highly contaminated waste water is removed through a sludge removal port 94. Sand 76 moves continuously down through vessel 70 under the influence of gravity.

Phosphorus exists in waters and waste waters as dissolved ortho-phosphate, polyphosphate and complex organo-phosphorus compounds. In typical phosphorus containing waste waters, such as the secondary or tertiary effluents of municipal waste water treatment plants, there is a dissolved fraction, primarily as ortho-phosphate ($PO_4^{31}$) and poly-phosphates and as a micro-particulate or suspended fraction of phosphorous containing solids. Trace levels of arsenic are sometimes found in some sources of drinking water and in higher concentrations in some waste waters. Arsenic can occur in natural waters in the reduced arsenite, As(III) or oxidized arsenate, As(V) forms. Arsenate reacts with iron and aluminum salts to form insoluble compounds. Waters with arsenite contamination can be treated with an oxidizer such as chlorine to allow for further reaction with reactive metal salts. Ferric chloride or sulfate is typically used as a metal salt reagent to remove phosphorus and arsenic from water, although other salts and ferrous compounds can be used.

In the system described above, excess ferric iron enters sand bed 76 along with the particulate Fe—As or Fe—P solids and residual As or P in solution in the waste water. Ferric ions react with sand surfaces to form iron oxide coated sand (IOCS). IOCS sorbs residual solution As/P out of solution. The physical action of the moving sand abrades the surface of the sand granules, refreshing active sites for additional IOCS formation and Fe—As or Fe—P reactions. Hence, fresh reactive sites for As/P binding are continually presented to the flowing water via microscopic erosion of the sand surface.

For phosphorus, ferric chloride is added at a preferred molar ratio of 5:1 to 40:1 with the phosphorus in the waste water. The pre-reactor system allows for a pre-reaction to form metal phosphate salts such as $FePO_4$, Vivianite and humic-fulvic organic phosphorus solids that are amenable to filtration in the sand bed reactive filter system. Vivianite is a very thermodynamically stable compound that is rapidly formed in solutions of iron cations and phosphate. Excess iron salt reagent is passed unreacted into the sand bed where it binds to the surface of the sand to form iron coated sand, a phosphate and polyphosphate reactive surface. Metal cations will selectively bind to the silicate and other negatively charged groups on the solid sand surface. This binding will yield a partially charged cationic boundary layer on the iron coated sand surface that will be reactive with soluble ortho-phosphate and poly-phosphate. The mobile phase (treatment water) and stationary phase (iron coated sand) configuration of this process allows for near quantitative removal of phosphorus because diffusion processes are nearly eliminated in the dilute solution reactive pathway of this process. Testing has shown that this process can remove ortho-phosphate to less than detection limits (10 part per billion) at efficiencies greater than 99% and total phosphorus to less than 40 parts per billion at greater than 90% efficiency of removal from the original concentration.

The processes described above have been shown to produce iron arsenic solids that are classified non-hazardous by the Toxicity Characteristic Leaching Procedure (TCLP) directed by the Resource Conservation and Recovery Act (RCRA 42 U.S.C. s/s 6901 et seq.) and can be disposed in a landfill, and iron phosphate solids that may be used in agricultural applications as a low grade slow release fertilizer.

The reactive filter media are deployed in a moving bed to assist in continuous renewal of the reactive iron oxide layer. Movement may be accomplished, for example, by fluidizing or moving the bed using the fluid flow, by mechanical action such as augers or mixing bars, by acoustic action such as the application of ultrasonic waves or by physical transport using compressed air.

Other embodiments are possible. For example, the filter media can be any natural or synthetic, organic or inorganic substrate that can react with dissolved iron to form a reactive oxide surface. The particle size of the filter media will be a size suitable for the level of filtration and flow desired. It is expected that the following inorganic materials will provide suitable filtration media: sand; silica beads or granules; high silicate glass; glass beads; glass sand; zeolite; mineral sands such as olivine, hematite, goethite; diatomaceous earth; iron oxyhydroxide granules; iron oxide granules; ceramic beads or granules; iron metal granules or beads; iron metal coated beads or granules; and synthetic or natural iron coated sand. It is expected that the following organic materials will provide suitable filtration media: polystyrene beads; polyethylene beads; modified cationic surface polymer beads; modified anionic surface polymer beads; mixed or pure polymer beads or granules; and polymer coated inorganic beads or granules. Some of these materials can have naturally occurring reactive sites that can be maintained or supplemented by the addition of active reagents such as ferric chloride solution. Because of the well known filtration properties of sand, its inexpensive use, its routine application in water treatment, its natural reactive silicate surface for inner sphere and outer sphere metal oxide binding to form iron oxide coated sand, and its abrasion properties, it is the preferred embodiment of an active filtration media in a moving bed process.

Suitable filtration media include corroding iron metal granules or ion exchange resins with the ability to bind iron compounds. Corroding iron metal granules allow for reductive processes that can be used to remove trace amounts of chlorinated solvents in water. Testing has shown that a 30% by volume iron-sand bed deployed in the system of FIG. 1 has a solution oxidation-reduction potential of $-200$ mV versus the standard hydrogen electrode. Typical deployments of static beds of iron granules or iron granules and sand suffer from loss of porosity or passivation of the reactive iron metal surface. The motion of a moving bed deployment allows for a continual refreshing of the iron metal surface and its associated chemically reactive sites as well as maintenance of filtration ability. A 98% efficiency has been demonstrated for removing phosphorus from contaminated discharge water originally containing 2 to 3 parts per million phosphorus.

In some circumstances, removing arsenic for example, it may be desirable to pre-oxidize the waste water to convert arsenite to the iron reactive arsenate. Arsenite in natural solutions at circumneutral pH is non-ionic and therefore typically non-reactive in most treatment deployments. Pre-oxidation can be accomplished using conventional water oxidation operations such as chlorination, sonication or ozonation. The pre-oxidation operation can be part of a full water treatment process train and may be preceded or followed by other conventional water treatment processes such as filtration, aeration, chemical treatment, flocculation, clarification and others that may be required in the normal processing and disinfection of drinking water.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A reactive filtration method, comprising continuously regenerating an iron oxide coated sand bed by agitating a mixture of iron granules and sand under aerobic conditions while simultaneously filtering contaminants from waste water flowing through the sand bed.

* * * * *